US010589430B2

(12) United States Patent
Kossett

(10) Patent No.: US 10,589,430 B2
(45) Date of Patent: Mar. 17, 2020

(54) THROWABLE ROBOT WITH IMPROVED DRIVE SYSTEM

(71) Applicant: ReconRobotics, Inc., Edina, MN (US)

(72) Inventor: Alex J. Kossett, Minnetonka, MN (US)

(73) Assignee: ReconRobotics, Inc., Edina, MN (US)

(*) Notice: Subject to any disclaimer, the term of this patent is extended or adjusted under 35 U.S.C. 154(b) by 21 days.

(21) Appl. No.: 15/998,686

(22) Filed: Aug. 15, 2018

(65) Prior Publication Data

US 2019/0054633 A1 Feb. 21, 2019

Related U.S. Application Data

(60) Provisional application No. 62/545,849, filed on Aug. 15, 2017, provisional application No. 62/545,879, filed on Aug. 15, 2017.

(51) Int. Cl.

| B60K 1/04 | (2019.01) |
|---|---|
| B25J 13/08 | (2006.01) |
| B25J 19/00 | (2006.01) |
| B25J 5/00 | (2006.01) |
| B62D 57/02 | (2006.01) |
| F41H 7/00 | (2006.01) |
| B60K 17/04 | (2006.01) |
| B60K 7/00 | (2006.01) |

(Continued)

(52) U.S. Cl.
CPC .......... *B25J 13/085* (2013.01); *B25J 5/007* (2013.01); *B25J 19/0016* (2013.01); *B60K 1/04* (2013.01); *B60K 7/0007* (2013.01); *B60K 17/043* (2013.01); *B60K 17/12* (2013.01); *B62D 57/02* (2013.01); *F41H 7/005* (2013.01); *B25J 19/023* (2013.01); *B60K 2007/0092* (2013.01)

(58) Field of Classification Search
CPC .......... B25J 13/085; B25J 5/007; B60K 1/04; B60K 17/12
USPC ..................................................... 318/568.11
See application file for complete search history.

(56) References Cited

U.S. PATENT DOCUMENTS

| 1,408,885 A | 3/1922 | Humphrey |
|---|---|---|
| 2,818,301 A | 12/1957 | Hayden |

(Continued)

FOREIGN PATENT DOCUMENTS

| CN | 202138435 U | 2/2012 |
|---|---|---|
| CN | 104228998 | 12/2014 |

(Continued)

OTHER PUBLICATIONS

International Search Report for Application No. PCT/US2018/000182 dated Jan. 3, 2019 (16 pgs.).

(Continued)

*Primary Examiner* — Kawing Chan
(74) *Attorney, Agent, or Firm* — Christensen, Fonder, Dardi & Herbert PLLC

(57) ABSTRACT

A two wheeled throwable robot comprises an elongate chassis with two ends, a motor at each end, drive wheels connected to the motors, and a tail extending from the elongate chassis. The throwable robot includes a pair of torque limiting mechanisms, each torque limiting mechanism being operatively coupled between a motor and a drive wheel. Each torque limiting mechanism comprises a drive flange portion, a driven flange portion and a plurality of rollers. A spring element provides a ring force that biases the rollers toward the driven flange portion.

20 Claims, 17 Drawing Sheets

(51) Int. Cl.
*B60K 17/12* (2006.01)
*B25J 19/02* (2006.01)

(56) References Cited

U.S. PATENT DOCUMENTS

| | | | |
|---|---|---|---|
| 4,061,199 A | 12/1977 | Last | |
| 4,300,308 A | 11/1981 | Ikeda | |
| 4,334,221 A | 6/1982 | Rosenhagen et al. | |
| 4,402,158 A | 9/1983 | Seki et al. | |
| 4,406,085 A | 9/1983 | Rhodes | |
| 4,443,968 A | 4/1984 | Law | |
| 4,572,530 A | 2/1986 | Marino | |
| 4,575,304 A | 3/1986 | Nakagawa et al. | |
| 4,648,853 A | 3/1987 | Siegfried | |
| 4,736,826 A | 4/1988 | White et al. | |
| 4,773,889 A | 9/1988 | Rosenwinkel et al. | |
| 4,899,945 A | 2/1990 | Jones | |
| 4,906,051 A | 3/1990 | Vilhauer, Jr. | |
| 4,913,458 A | 4/1990 | Hamilton | |
| 4,993,912 A | 2/1991 | King et al. | |
| 5,085,062 A | 2/1992 | Capdevila | |
| 5,129,709 A | 7/1992 | Klamer | |
| D338,474 S | 8/1993 | Christensen | |
| 5,241,380 A | 8/1993 | Benson et al. | |
| 5,350,033 A | 9/1994 | Kraft | |
| 5,473,364 A | 12/1995 | Burt | |
| 5,487,692 A | 1/1996 | Mowrer et al. | |
| 5,551,545 A | 9/1996 | Gelfman | |
| 5,554,914 A | 9/1996 | Miyazawa | |
| 5,576,605 A | 11/1996 | Miyazawa | |
| 5,596,255 A | 1/1997 | Miyazawa | |
| 5,610,488 A | 3/1997 | Miyazawa | |
| 5,721,691 A | 2/1998 | Wuller et al. | |
| 5,732,074 A | 3/1998 | Spaur et al. | |
| 5,759,083 A | 6/1998 | Polumbaum et al. | |
| 5,762,533 A | 6/1998 | Tilbor et al. | |
| 5,781,005 A | 7/1998 | Vig et al. | |
| 5,839,795 A | 11/1998 | Matsuda et al. | |
| 5,871,386 A | 2/1999 | Bart et al. | |
| 5,888,135 A | 3/1999 | Barton, Jr. et al. | |
| 5,908,454 A | 6/1999 | Zyburt et al. | |
| 6,046,565 A | 4/2000 | Thorne | |
| 6,066,026 A | 5/2000 | Bart et al. | |
| 6,101,951 A | 8/2000 | Sigel | |
| 6,109,568 A | 8/2000 | Gilbert et al. | |
| 6,199,880 B1 | 3/2001 | Favorito et al. | |
| 6,313,724 B1 | 11/2001 | Osterweil | |
| 6,322,088 B1 | 11/2001 | Klamer et al. | |
| 6,502,657 B2 | 1/2003 | Kerrebrock et al. | |
| 6,548,982 B1 | 4/2003 | Papanikolopoulos et al. | |
| 6,574,536 B1 | 6/2003 | Kawagoe et al. | |
| 6,824,508 B2 | 11/2004 | Kim et al. | |
| 6,860,346 B2 | 3/2005 | Burt et al. | |
| 6,902,464 B1 | 6/2005 | Lee | |
| D540,503 S | 4/2007 | Tsang | |
| 7,249,640 B2 | 7/2007 | Horchler et al. | |
| D584,366 S | 1/2009 | Bowen et al. | |
| 7,559,385 B1 | 7/2009 | Burt et al. | |
| D626,577 S | 11/2010 | Carlson et al. | |
| D637,217 S | 5/2011 | Carlson et al. | |
| 8,186,469 B2 | 5/2012 | Yim et al. | |
| 8,197,298 B2 * | 6/2012 | Willett | A63H 17/02 446/164 |
| 8,342,440 B2 | 1/2013 | Papanikolopoulos et al. | |
| 8,496,077 B2 | 7/2013 | Nesnas et al. | |
| 8,505,667 B2 | 8/2013 | Kim et al. | |
| 8,636,096 B2 | 1/2014 | Kim et al. | |
| 8,720,614 B2 * | 5/2014 | Nesnas | B25J 5/007 180/7.5 |
| 8,776,977 B2 | 7/2014 | Lansberry et al. | |
| 8,884,763 B2 * | 11/2014 | Hudson | G01S 17/023 318/560 |
| 9,020,639 B2 | 4/2015 | Bewley et al. | |
| 9,061,544 B2 | 6/2015 | Carlson et al. | |
| 9,557,740 B2 | 1/2017 | Crawley | |
| 9,733,720 B2 | 8/2017 | Kavli et al. | |
| 1,004,681 A1 | 8/2018 | Sellner et al. | |
| 10,124,483 B1 * | 11/2018 | Cotton | B62D 61/00 |
| 2003/0038607 A1 | 2/2003 | Yim et al. | |
| 2003/0092964 A1 | 5/2003 | Kim et al. | |
| 2003/0137268 A1 | 7/2003 | Papanikolopoulos et al. | |
| 2004/0000439 A1 | 1/2004 | Burt et al. | |
| 2008/0143065 A1 | 6/2008 | DeFazio et al. | |
| 2009/0099709 A1 | 4/2009 | Troy | |
| 2010/0032224 A1 | 2/2010 | Liu | |
| 2010/0152922 A1 | 6/2010 | Carlson et al. | |
| 2010/0318059 A1 | 12/2010 | Farritor et al. | |
| 2011/0139923 A1 * | 6/2011 | Papanikolopoulos | A63H 27/12 244/2 |
| 2012/0059520 A1 | 3/2012 | Kossett | |
| 2012/0073930 A1 | 3/2012 | Lansberry et al. | |
| 2012/0137862 A1 | 6/2012 | Kossett et al. | |
| 2012/0185093 A1 * | 7/2012 | Kossett | B25J 11/002 700/259 |
| 2014/0208976 A1 | 7/2014 | Jung et al. | |
| 2015/0175202 A1 | 6/2015 | MacGregor et al. | |
| 2019/0054641 A1 * | 2/2019 | Kossett | B25J 19/027 |
| 2019/0092406 A1 * | 3/2019 | Kossett | F41H 7/005 |

FOREIGN PATENT DOCUMENTS

| | | |
|---|---|---|
| EP | 1870254 | 12/2007 |
| FR | 2567078 | 1/1986 |
| JP | 63-269701 | 10/1996 |
| JP | 10-69314 | 3/1998 |
| KR | 10-1184023 | 9/2012 |
| KR | 10-1217846 | 1/2013 |
| KR | 10-1226261 | 1/2013 |
| KR | 10-2011013991 | 1/2013 |
| KR | 10-2014-0097709 | 8/2014 |
| RU | 89837 U1 | 12/2009 |
| WO | WO2002/24417 | 3/2002 |
| WO | WO2013/059515 | 4/2013 |
| WO | WO2013/103171 | 7/2013 |

OTHER PUBLICATIONS

International Search Report for Application No. PCT/US2018/000161 dated Dec. 14, 2018 (19 pgs.).

International Search Report for Application No. PCT/US2018/000198 dated Dec. 17, 2018 (12 pgs.).

* cited by examiner

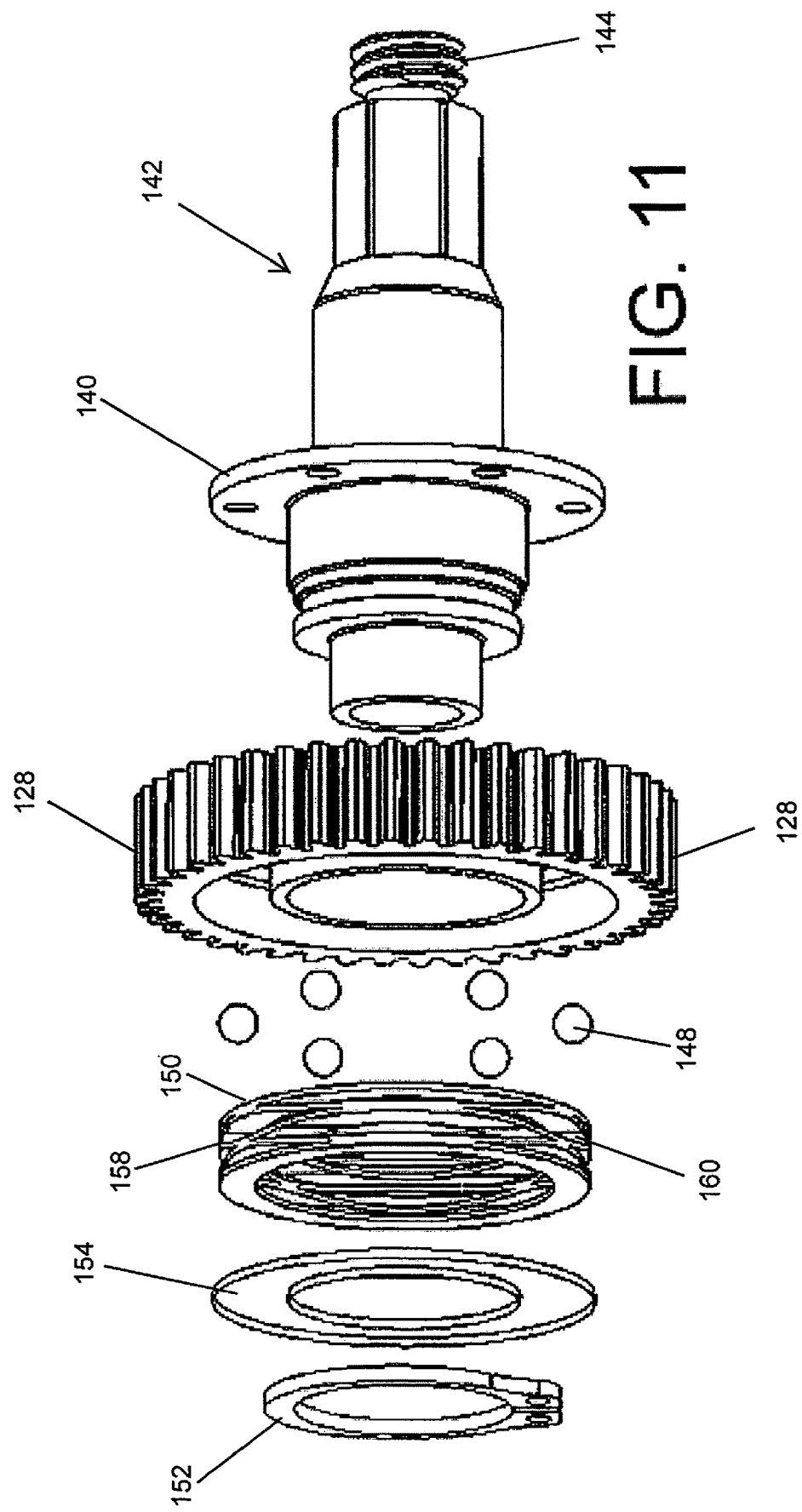

THROWABLE ROBOT WITH IMPROVED DRIVE SYSTEM

CROSS-REFERENCE TO RELATED APPLICATIONS

The present application claims the benefit of U.S. Provisional Application No. 62/545,849, filed Aug. 15, 2017, which is incorporated herein in its entirety by reference. The present application also claims the benefit of U.S. Provisional Application No. 62/545,879, filed Aug. 15, 2017, which is incorporated herein in its entirety by reference.

BACKGROUND OF THE INVENTION

Throwable robots used in military and policing operations need to be robust and able to survive exposure to rugged conditions including water and vertical drops. Improvements in reliability and performance for robots used in high stakes military and police operations are desirable.

SUMMARY OF THE INVENTION

This invention relates to a means to readily, reliably, and securely enable or disable a device, for example a throwable robot. In embodiments, the throwable surveillance robot comprises a pair of axially aligned drive wheels, each wheel having a maximum diameter. The surveillance robot may have a body comprising a housing extending between the drive wheels. In embodiments, the housing is disposed completely within a cylinder defined by the maximum diameters of the drive wheels. In embodiments, the housing defines a housing cavity containing a receiver, a transmitter and a video camera connected to the transmitter. The housing may include a key holding portion defining a key holding slot having a key insertion and withdrawal axis. In embodiments, throwing of the surveillance robot is facilitated by a design providing a total weight of less than six pounds. The pair of axially aligned drive wheels a starboard drive wheel and a port drive wheel.

In embodiments, the surveillance robot comprises a pair of motors disposed inside the housing cavity defined by the housing. In embodiments, the pair of motors comprises a starboard motor and a port motor, each motor comprising a motor shaft. A starboard motor gear may be fixed to the motor shaft of the starboard motor. The starboard motor gear may comprise a plurality of gear teeth configured to mate with the toothed outer portion of a starboard drive member. In embodiments, the starboard drive member comprises a starboard driving flange portion and the toothed outer portion. In embodiments, the starboard driving flange portion defines a plurality apertures. The apertures may be arranged in a radial pattern extending along a circular path. In embodiments, the starboard driving flange portion of the starboard drive member defines a central opening.

In embodiments, the surveillance robot comprises a starboard driven member comprising a mating shaft portion that extends through the central opening defined by the starboard drive member. In embodiments, the driven member is positioned so that a driven flange portion of the driven member is disposed opposite the driving flange of the starboard drive member. In embodiments, the starboard driven flange portion defines a plurality of holes, each hole being dimensioned and positioned to temporarily or permanently receive a portion of one of the plurality of rollers. In embodiments, each hole is dimensioned and configured such that one of the plurality of rollers cannot pass through the hole. In some embodiments, each hole comprises a through hole. In other embodiments, each hole comprises a blind hole. In some embodiments, the rollers comprise a plurality of cylindrical rods. In other embodiments, the rollers comprise a plurality of spherical balls.

The surveillance robot may also comprise a starboard spring element that provides a spring force. In embodiments, the spring force provided by the starboard spring element acts to bias each of the rollers toward the starboard driven flange of the starboard driven member. In embodiments, the starboard spring element comprises a wave spring. Wave springs that may be suitable in some applications are disclosed in the following patents, all of which are hereby incorporated by reference: U.S. Pat. Nos. 7,793,923, 6,758, 465, 6,669,184, 6,598,406, 6,408,631, 6,068,250, and 5,558, 393.

In embodiments, the surveillance robot comprises a pair of motors disposed inside the housing cavity defined by the housing. In embodiments, the pair of motors comprises a port motor and a port motor, each motor comprising a motor shaft. A port motor gear may be fixed to the motor shaft of the port motor. The port motor gear may comprise a plurality of gear teeth configured to mate with the toothed outer portion of a port drive member. In embodiments, the port drive member comprises a port driving flange portion and the toothed outer portion. In embodiments, the port driving flange portion defines a plurality apertures. The apertures may be arranged in a radial pattern extending along a circular path. In embodiments, the port driving flange portion of the port drive member defines a central opening.

In embodiments, the surveillance robot comprises a port driven member comprising a mating shaft portion that extends through the central opening defined by the port drive member. In embodiments, the driven member is positioned so that a driven flange portion of the driven member is disposed opposite the driving flange of the port drive member. In embodiments, the port driven flange portion defines a plurality of holes, each hole being dimensioned and positioned to temporarily or permanently receive a portion of one of the plurality of rollers. In embodiments, each hole is dimensioned and configured such that one of the plurality of rollers cannot pass through the hole. In some embodiments, each hole comprises a through hole. In other embodiments, each hole comprises a blind hole. The surveillance robot may also comprise a port spring element that provides a spring force. In embodiments, the spring force provided by the port spring element acts to bias each of the rollers toward the port driven flange of the port driven member. In embodiments, the port spring element comprises a wave spring.

In embodiments, the starboard mating shaft portion of the starboard driven member extends through a lumen defined by the starboard spring element and the port mating shaft portion of the port driven member extends through a lumen defined by the port spring element. In embodiments, the surveillance robot further comprises a starboard pressure plate and a port pressure plate. In embodiments, the starboard mating shaft portion of the starboard driven member extends through a starboard pressure plate opening defined by the starboard pressure plate. In embodiments, the starboard pressure plate is disposed between the starboard spring element and a plurality of rollers. In embodiments, these rollers are at least partially disposed in the apertures defined by the starboard driving flange portion. In embodiments, the port mating shaft portion of the port driven member extends through a port pressure plate opening defined by the port pressure plate. In embodiments, the port pressure plate is disposed between the port spring element and a plurality of rollers. In embodiments, these rollers are at least partially disposed in the apertures defined by the port driving flange portion.

In embodiments, the surveillance robot further comprises a starboard retention ring, a starboard pressure disk, a port retention ring, and a port pressure disk. In embodiments, the starboard retention ring is received in a groove defined by the starboard mating shaft portion of the starboard driven member and the port retention ring is received in a groove defined by the port mating shaft portion of the port driven member. In embodiments, the starboard mating shaft portion of the starboard driven member extends through a starboard pressure disk opening defined by the starboard pressure disk. In embodiments, the starboard pressure disk is disposed between the starboard spring element and the starboard retention ring. In embodiments, the port mating shaft portion of the port driven member extends through a port pressure disk opening defined by the port pressure disk. In embodiments, the port pressure disk is disposed between the port spring element and the port retention ring.

In embodiments, each driven shaft portion includes a thread. In embodiments, a nut may threadingly engage the thread on each driven shaft portion. In embodiments, a wheel may be fixed to each driven shaft portion. In embodiments, a starboard ring panel is disposed between a starboard retaining ring and a starboard pressure disk. In embodiments, a port ring panel is disposed between a port retaining ring and a port pressure disk. In embodiments, each spring element defines a spring lumen.

A feature and benefit of embodiments is a highly consistent torque limiting function, both between different assemblies and through time on a given assembly.

A feature and benefit of embodiments is a torque limiting function that remains consistent while being exposed to contaminants such as water, grease and oil. A related feature and benefit of embodiments is a design that allows portions of the drivetrain to be lubricated without concern that lubricant will interfere with the operation of the torque limiting mechanism.

The above summary is not intended to describe each illustrated embodiment or every implementation of the present disclosure.

DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 11 is an exploded perspective view showing a torque limiting assembly/mechanism in accordance with the detailed description.

Figure 1:
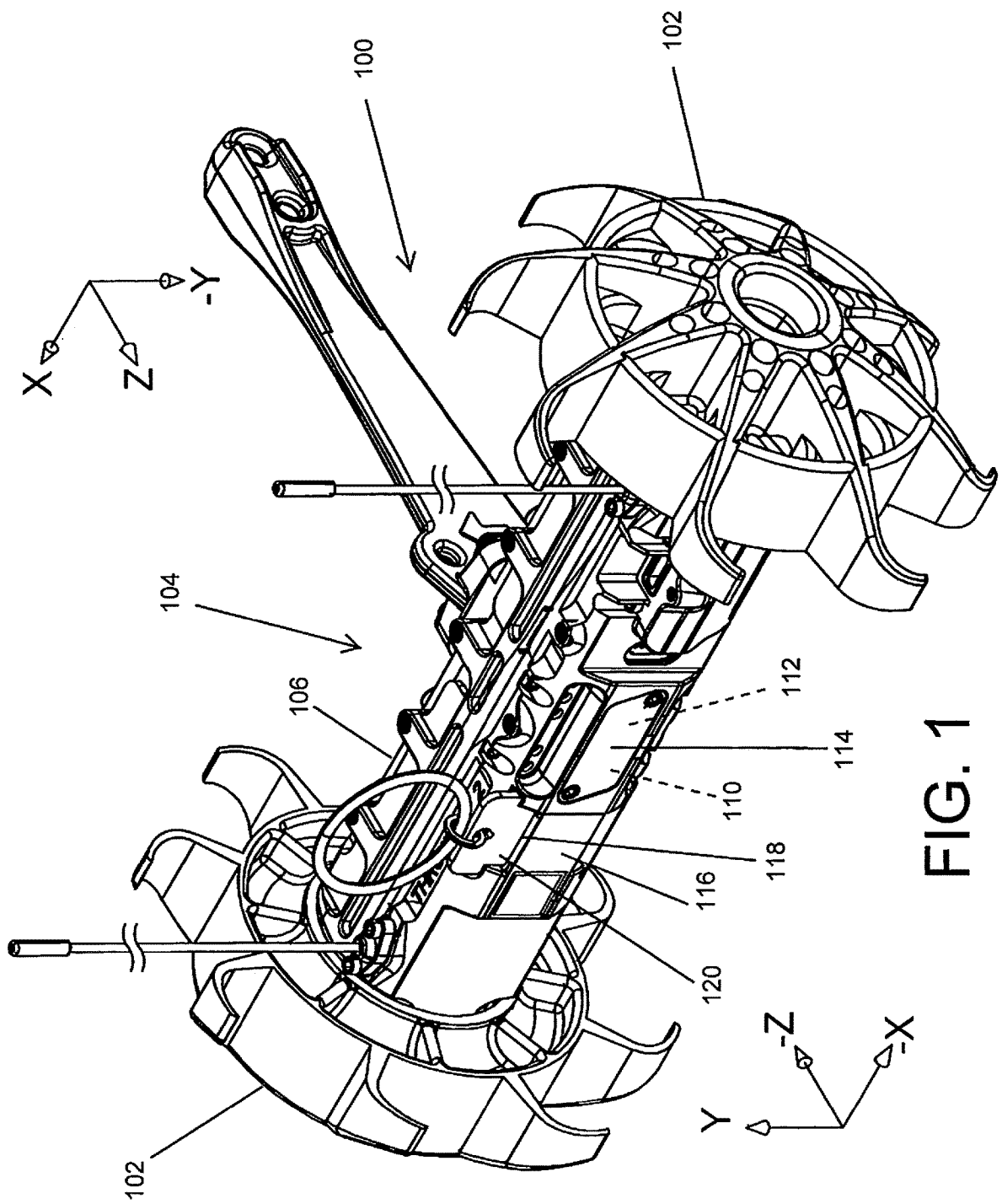
FIG. 1 is a top, front, left perspective view of a throwable robot in accordance with the detailed description.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 2:
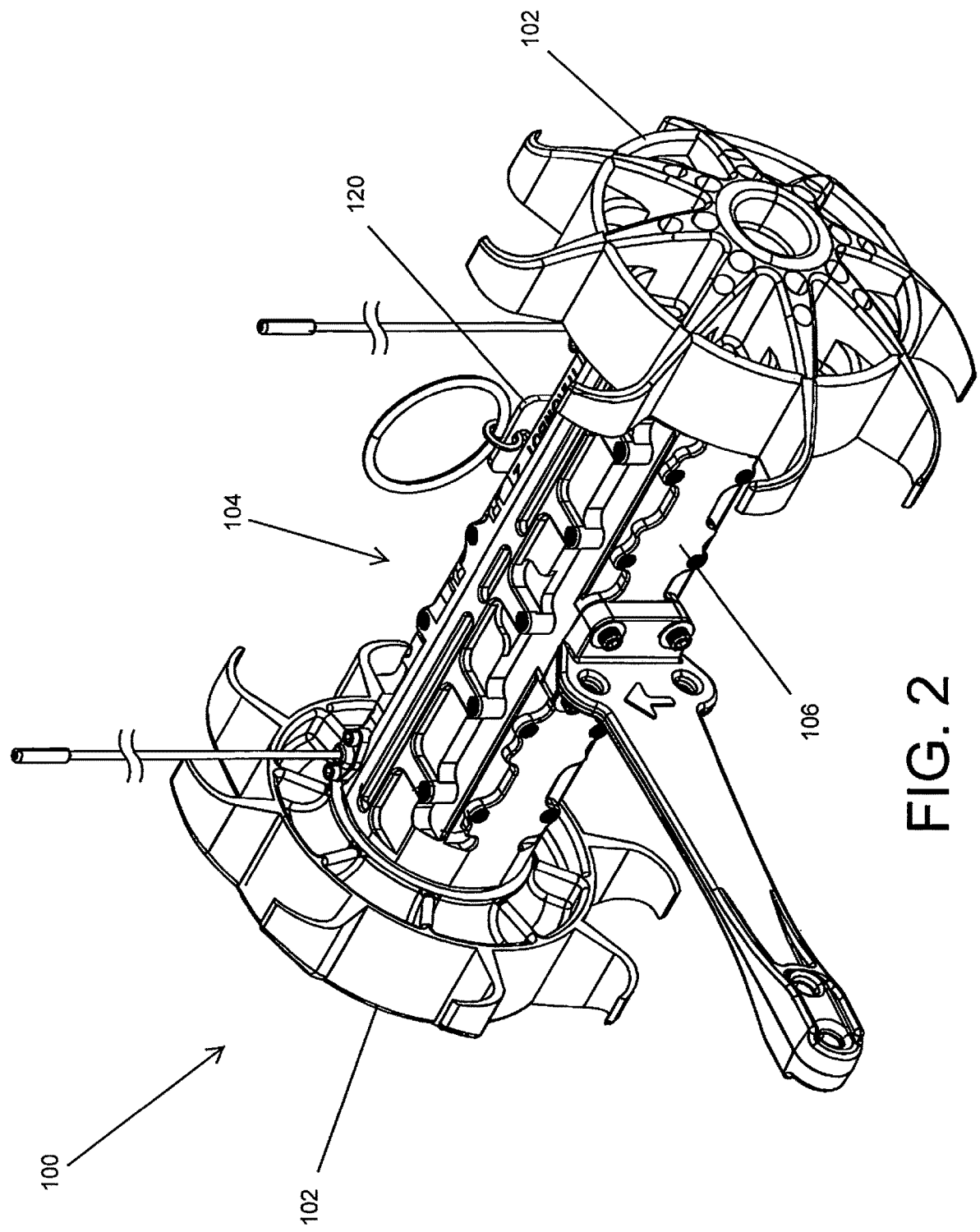
FIG. 2 is a top, rear, right perspective view of a throwable robot in accordance with the detailed description.
Figure 3:
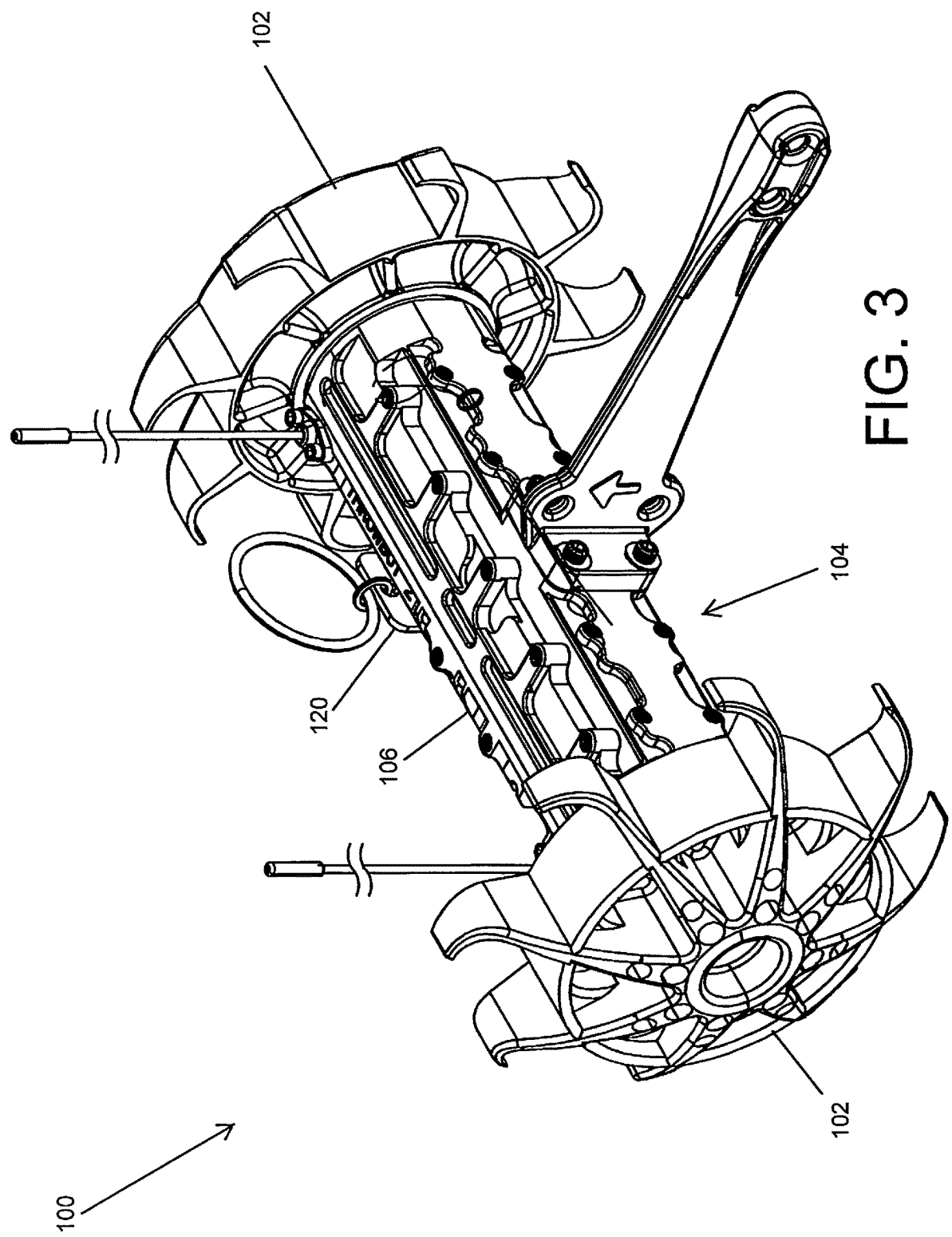
FIG. 3 is a top, rear, left perspective view of a throwable robot in accordance with the detailed description.
Figure 4:
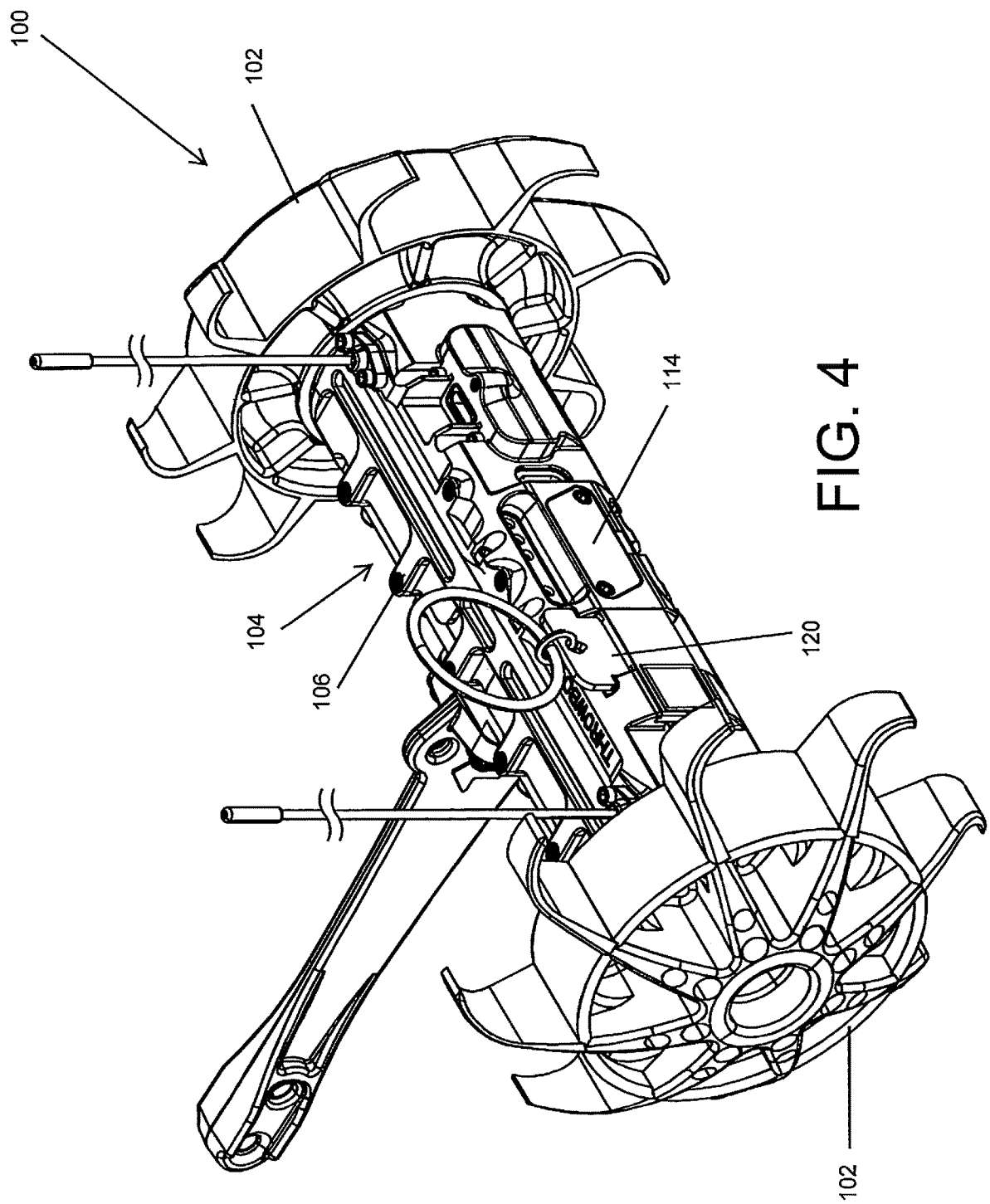
FIG. 4 is a top, front, right perspective view of a throwable robot in accordance with the detailed description.
Figure 5:
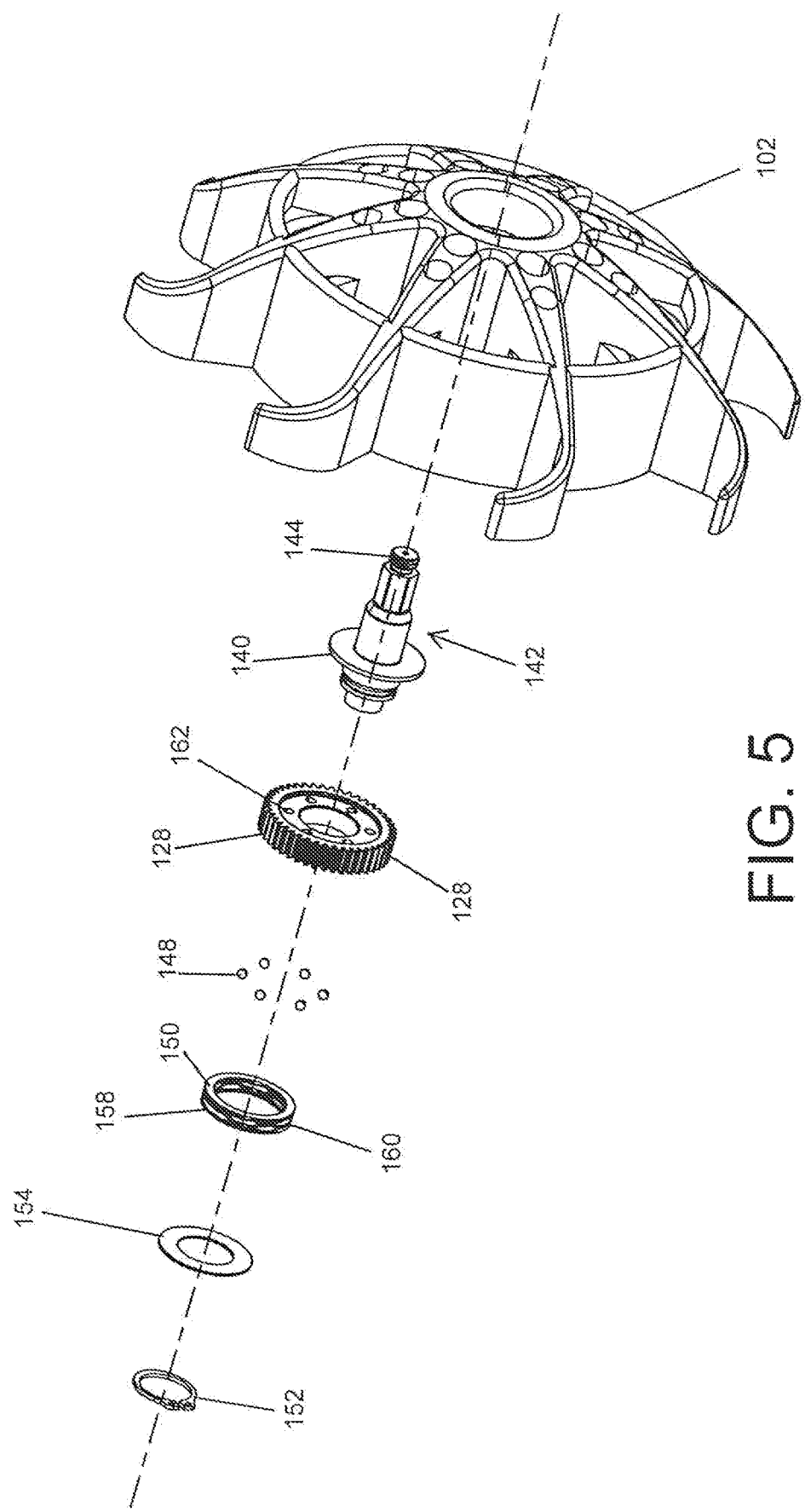
FIG. 5 is an exploded perspective view showing a wheel and a torque limiting assembly/mechanism in accordance with the detailed description.
Figure 6:
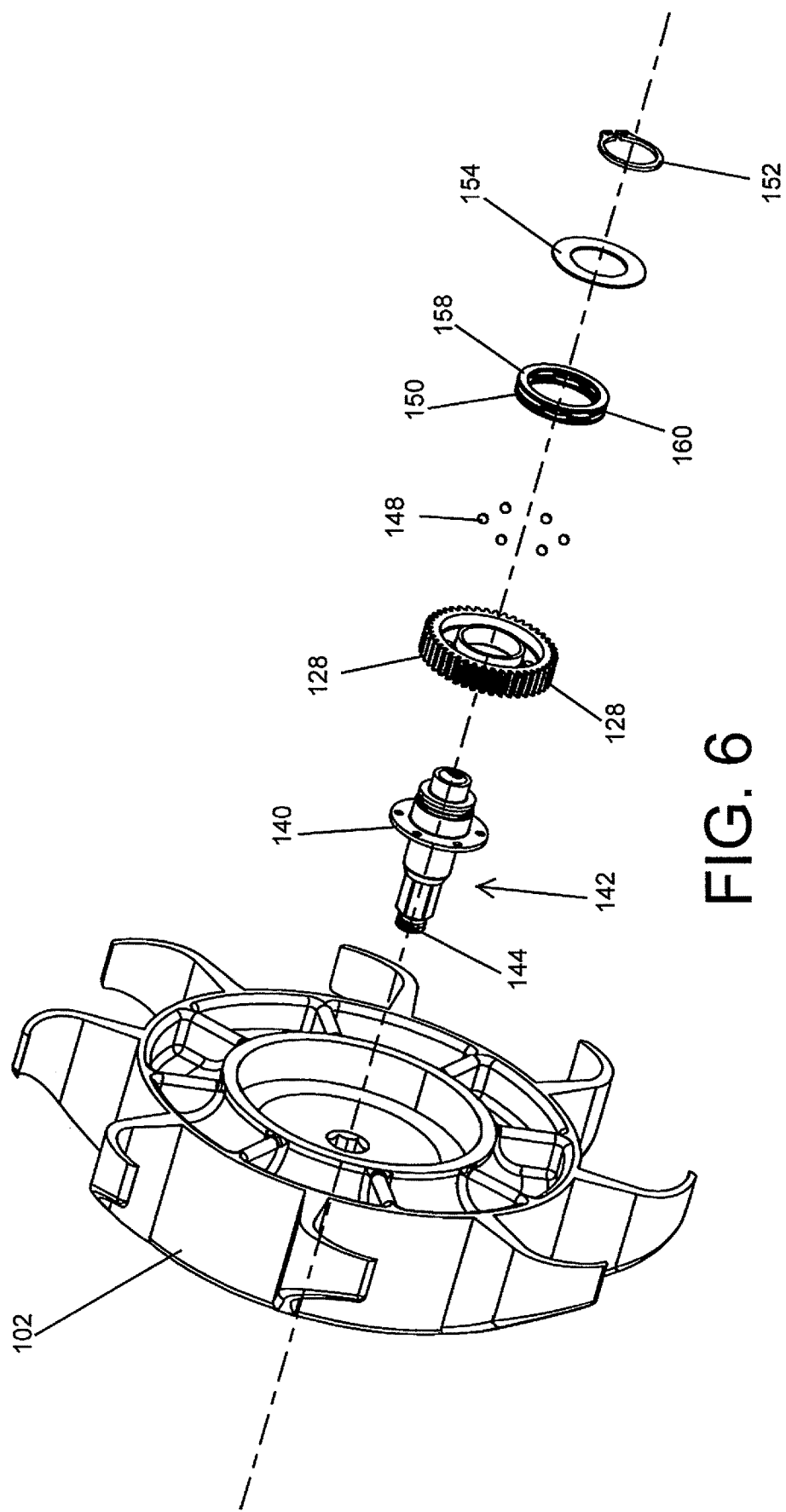
FIG. 6 is an exploded perspective view showing a wheel and a torque limiting assembly/mechanism in accordance with the detailed description.
Figure 7:
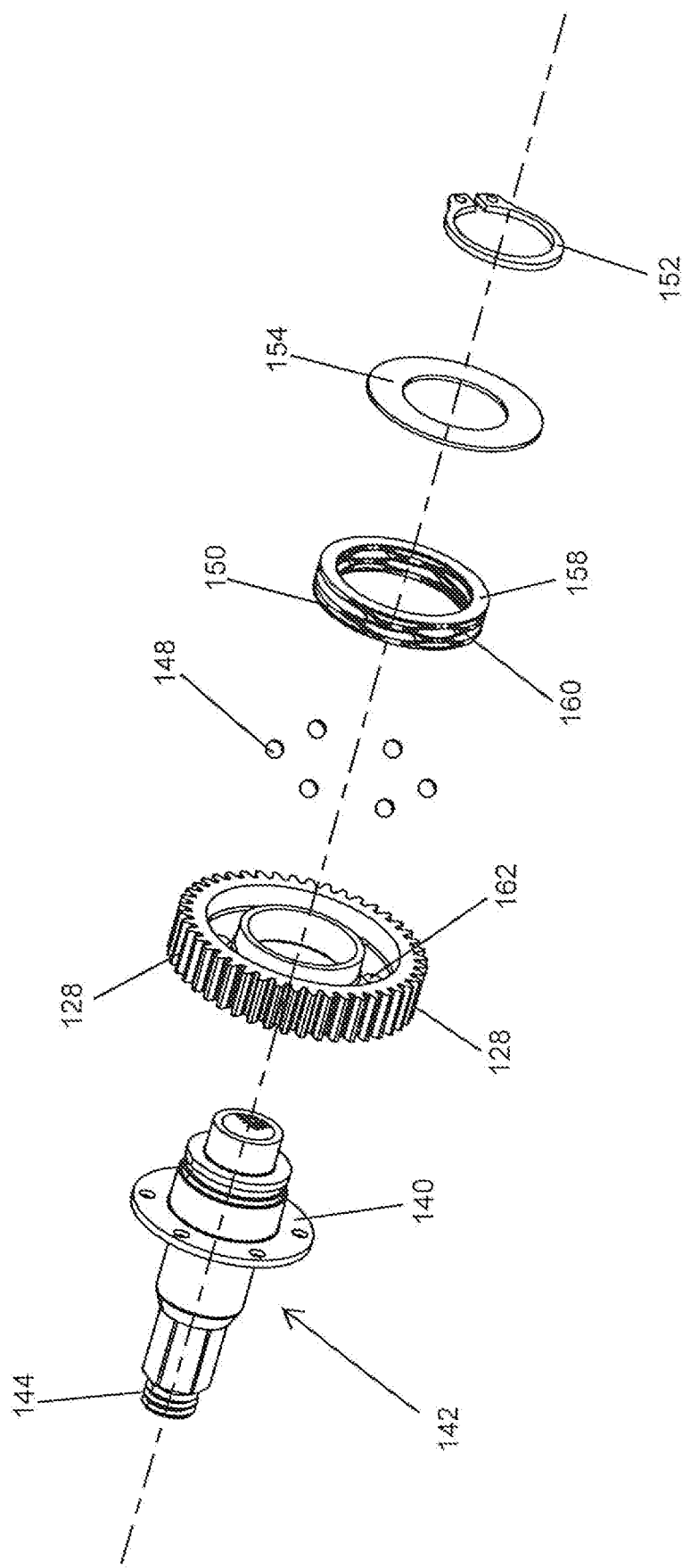
FIG. 7 is an exploded perspective view showing a torque limiting assembly/mechanism in accordance with the detailed description.
Figure 8:
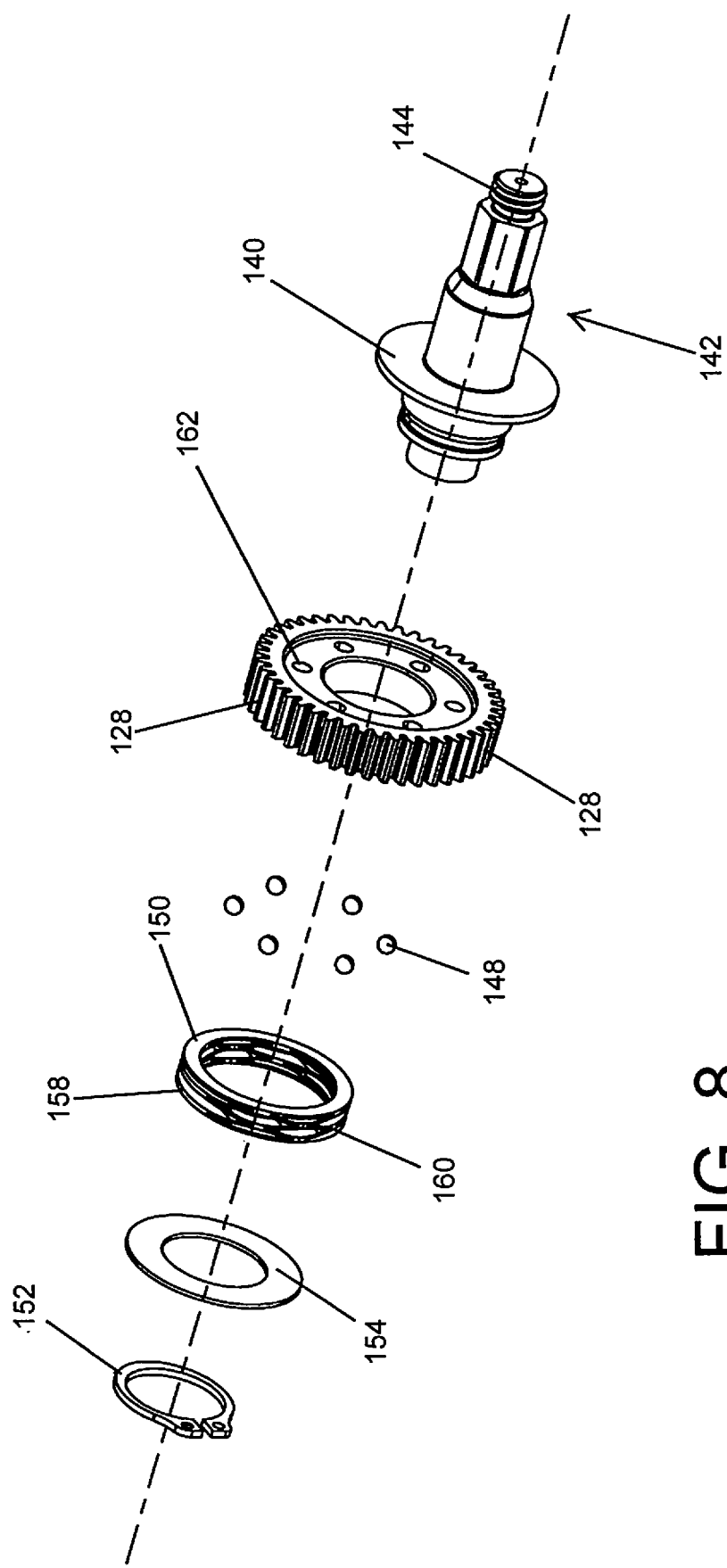
FIG. 8 is an exploded perspective view showing a torque limiting assembly/mechanism in accordance with the detailed description.
Figure 9:
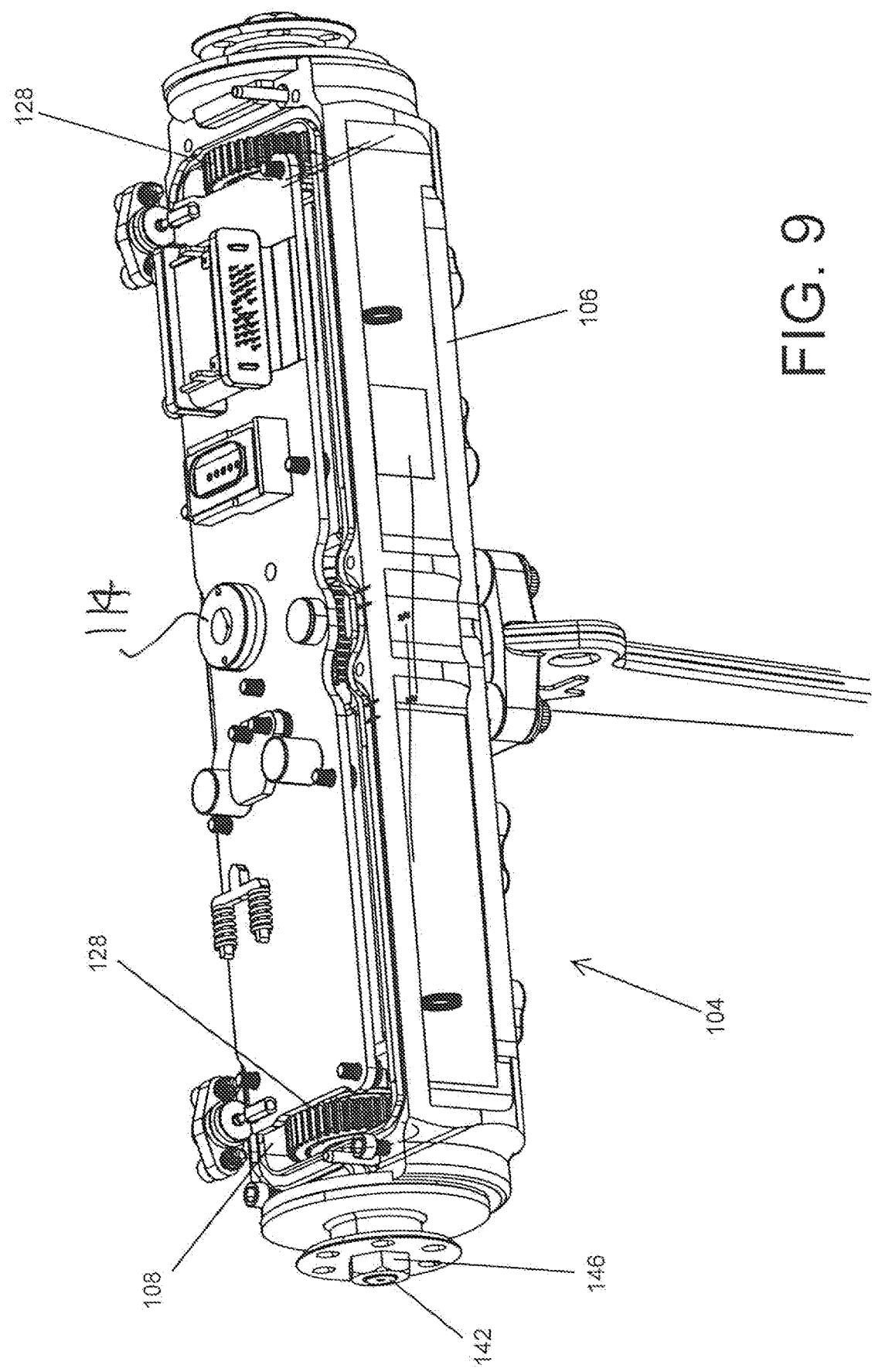
FIG. 9 is a perspective view showing a portion of a throwable robot. In the embodiment of FIG. 9, the wheels and a cover have been removed from the throwable robot for purposes of illustration.
Figure 10:
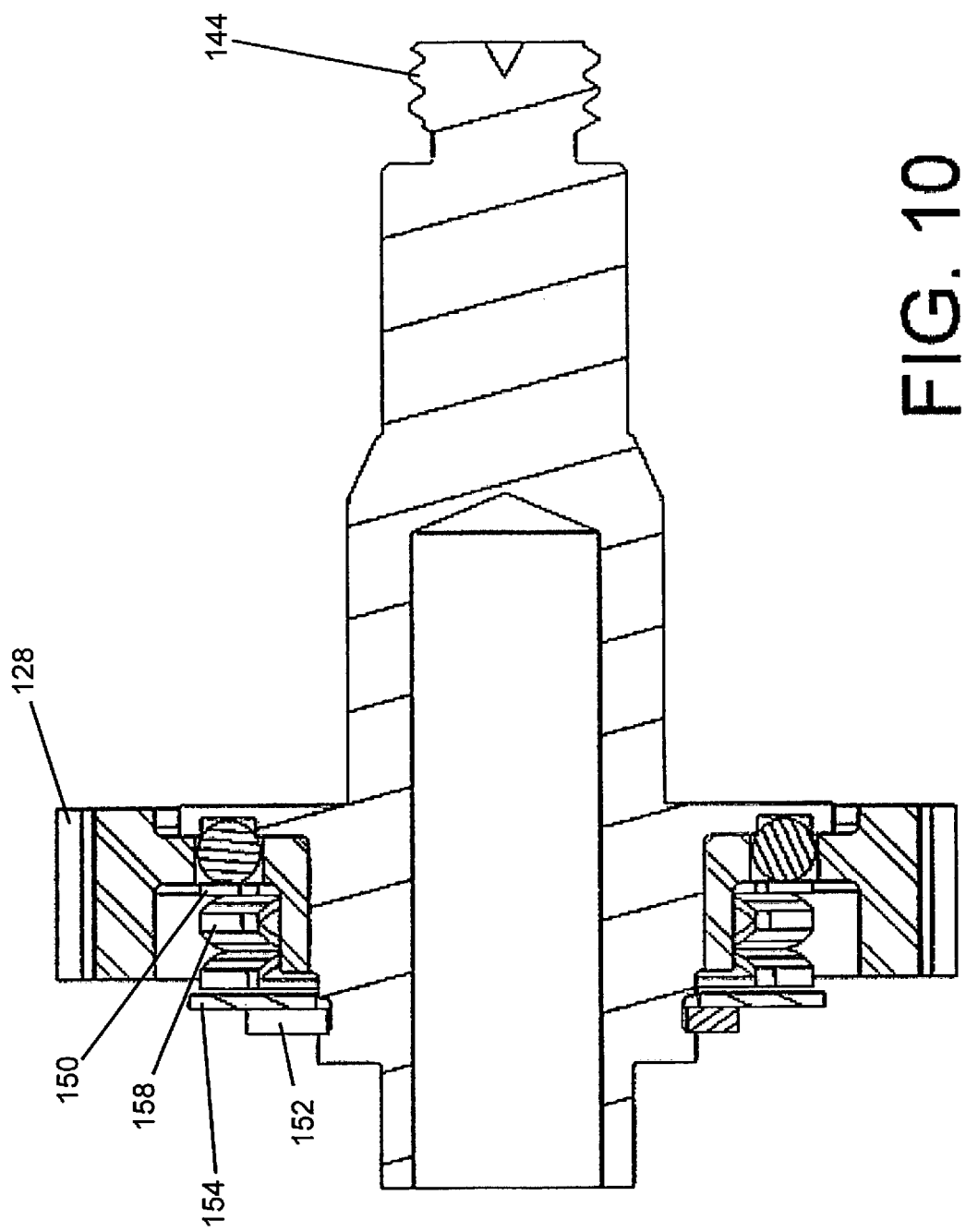
FIG. 10 is a cross-sectional view illustrating a torque limiting assembly/mechanism in accordance with the detailed description.

Referring to FIGS. 1 and 2, in embodiments, a throwable surveillance robot 100 comprises a pair of axially aligned drive wheels 102, each wheel 102 having a maximum diameter. The surveillance robot 100 may have a body 104 comprising a housing 106 extending between the drive wheels 102. In embodiments, the housing 106 is disposed completely within a cylinder defined by the maximum diameters of the drive wheels 102. In embodiments, the housing 106 defines a housing cavity 108 containing a receiver 110, a transmitter 112 and a video camera 114 connected to the transmitter 112. The housing 106 may include a key holding portion 116 defining a key holding slot 118 having a key insertion and withdrawal axis. In embodiments, throwing of the surveillance robot 100 is facilitated by a design providing a total weight of less than six pounds. The pair of axially aligned drive wheels a starboard drive wheel 102 and a port drive wheel 102.

Figure 12A:
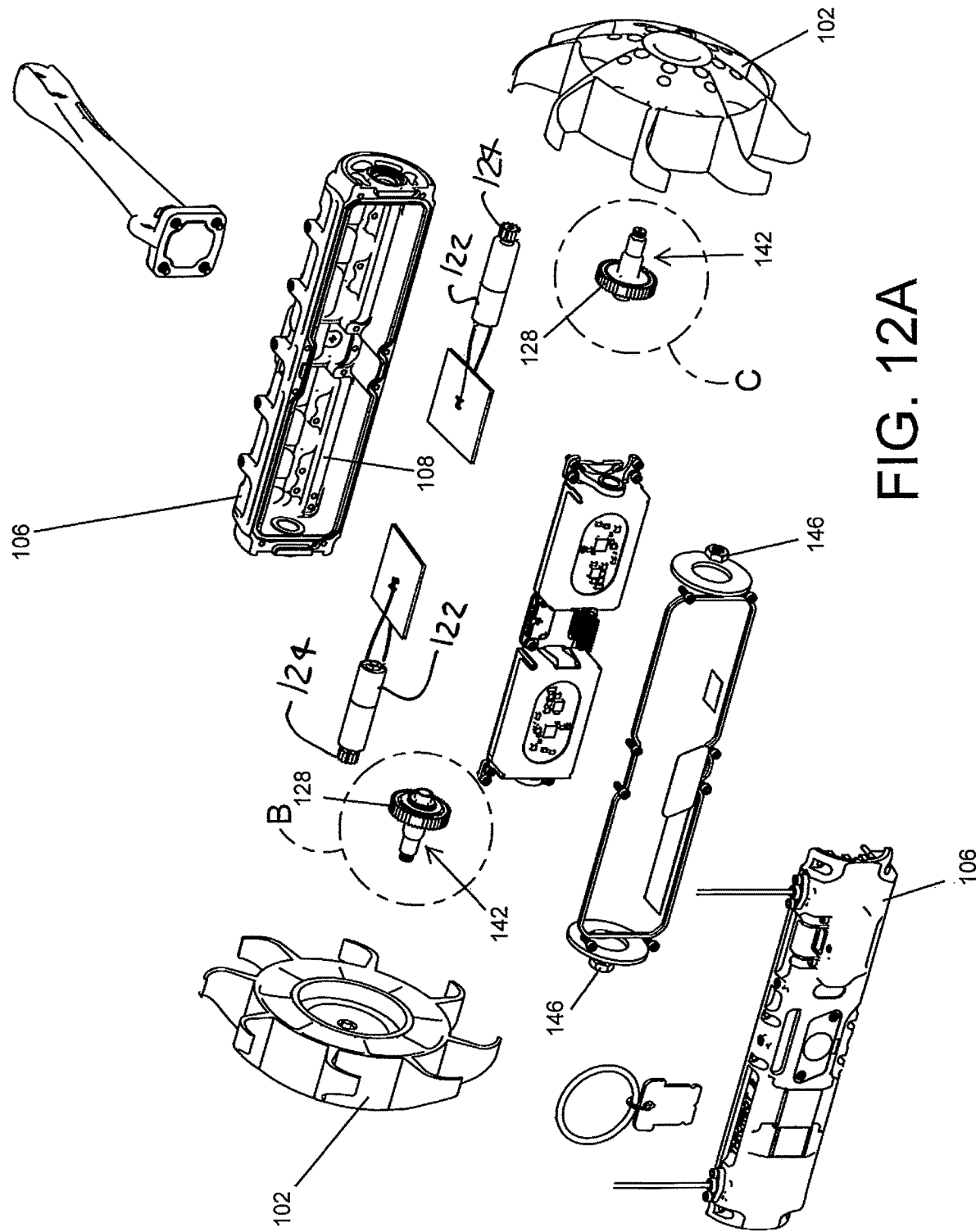
FIG. 12A is an exploded perspective view of a throwable robot in accordance with the detailed description.
Figure 12B:
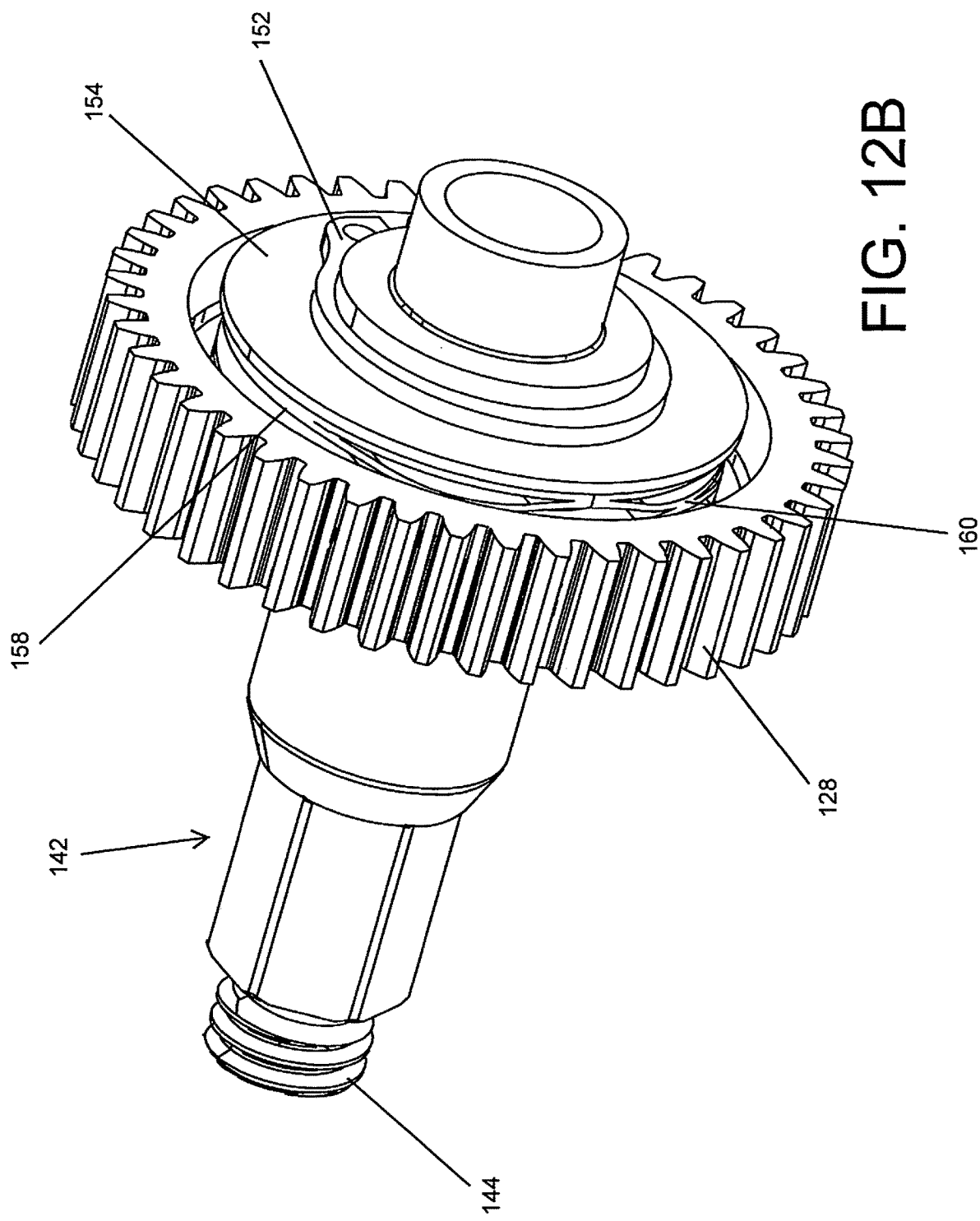
FIG. 12B is an enlarged perspective view further illustrating a torque limiting assembly/mechanism shown in FIG. 12A.
Figure 12C:
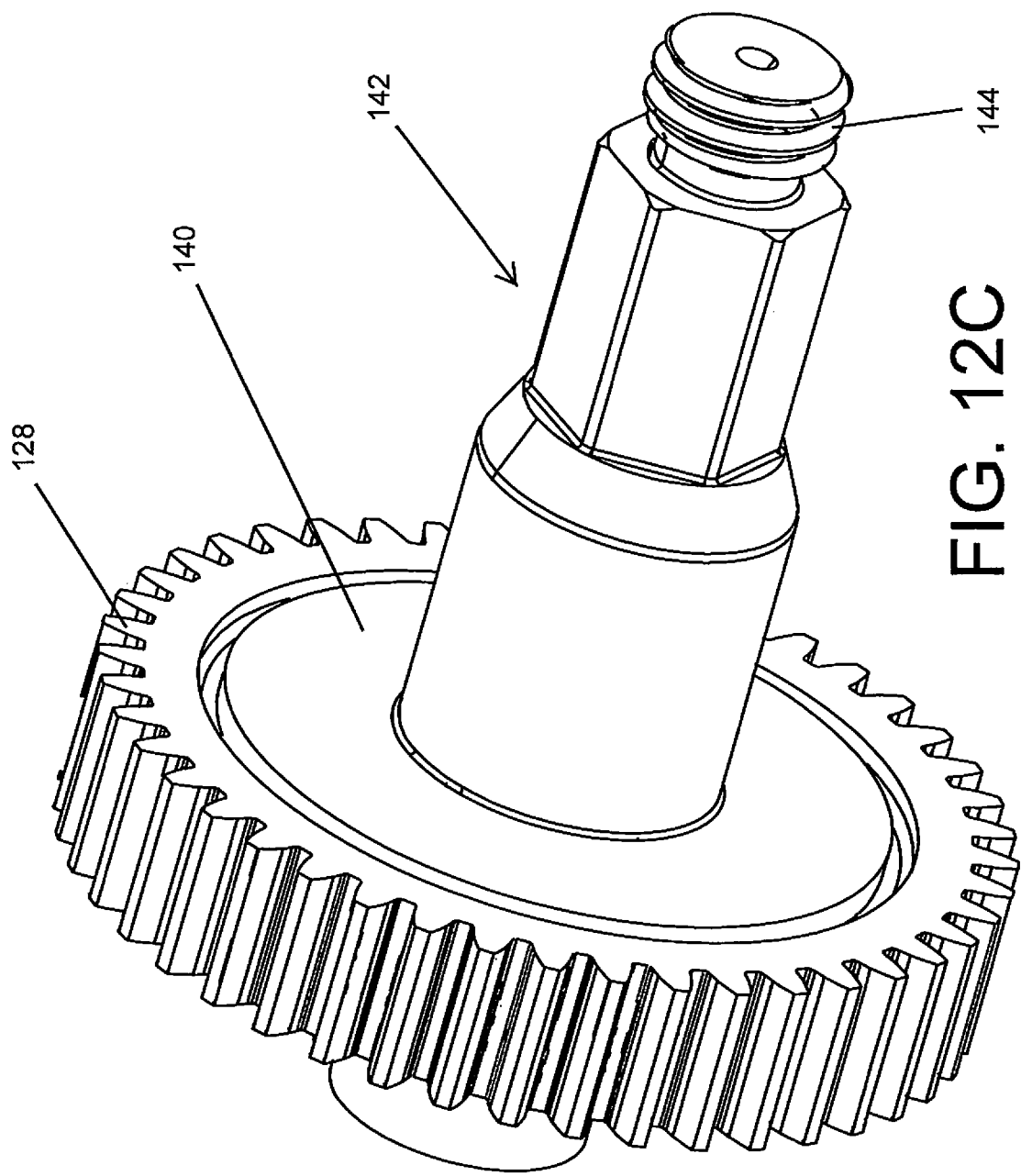
FIG. 12C is an enlarged perspective view further illustrating a torque limiting assembly/mechanism shown in FIG. 12A.
Figure 13:
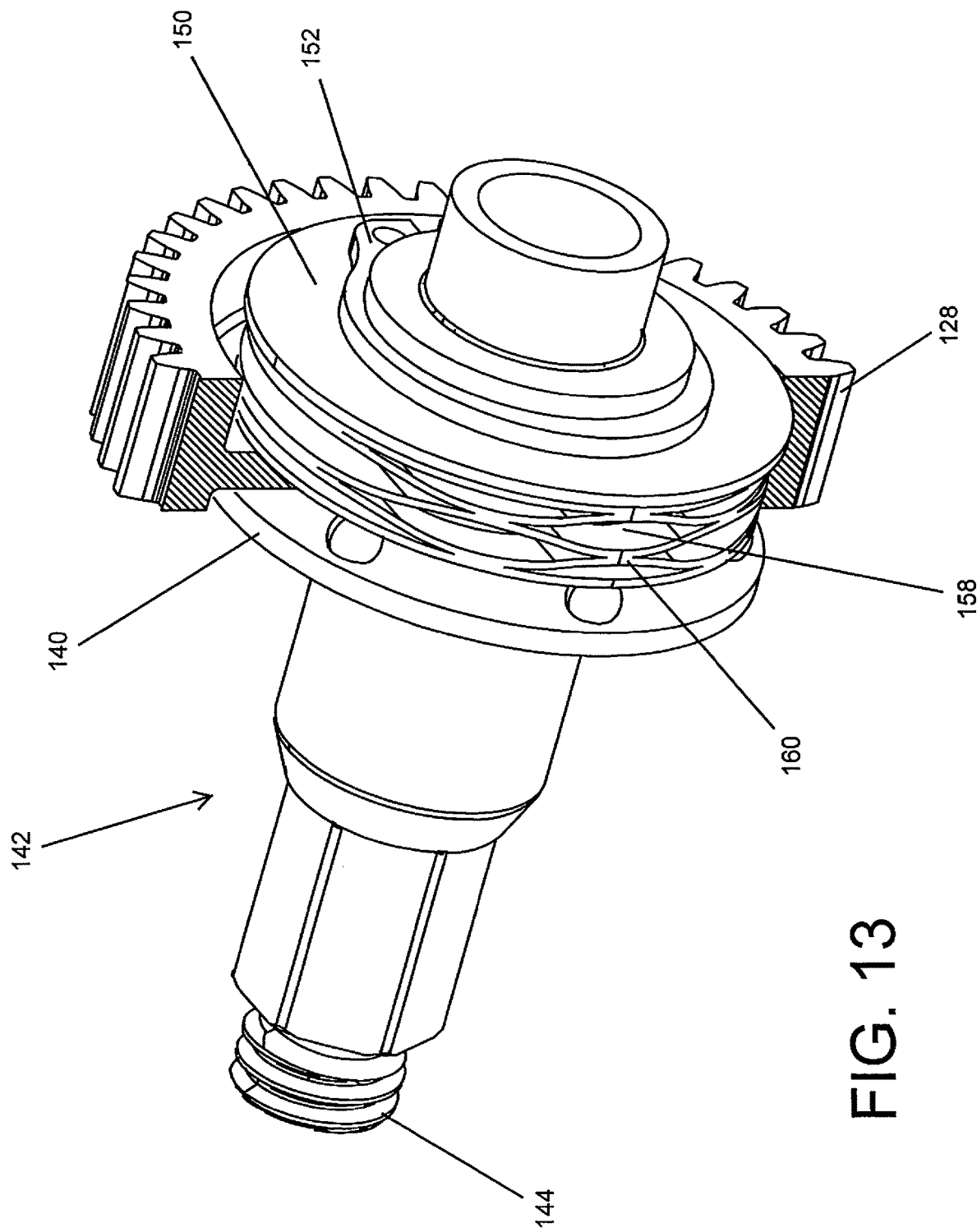
FIG. 13 is a partially cross-sectioned perspective view further illustrating the torque limiting assembly/mechanism shown in FIG. 12B.

Referring to FIGS. 1 and 12A, in embodiments, the surveillance robot 100 comprises a pair of motors disposed inside the housing cavity 108 defined by the housing 106. In embodiments, the pair of motors comprises a starboard motor 122 and a port motor 122, each motor comprising a motor shaft. A starboard motor gear 124 may be fixed to the motor shaft of the starboard motor 122. The starboard motor gear 124 may comprise a plurality of gear teeth configured to mate with the toothed outer portion 128 of a starboard drive member 126. In embodiments, the starboard drive member 126 comprises a starboard driving flange portion 130 and the toothed outer portion 128. In embodiments, the starboard driving flange portion 130 defines a plurality apertures 132. The apertures 132 may be arranged in a radial pattern extending along a circular path. In embodiments, the starboard driving flange portion 130 of the starboard drive member 126 defines a central opening 166.

Referring to FIGS. 1 and 7-15, in embodiments, the surveillance robot 100 comprises a starboard driven member 138 comprising a mating shaft portion 168 that extends through the central opening 166 defined by the starboard drive member 126. In embodiments, the driven member 138 is positioned so that a driven flange portion 140 of the driven member 138 is disposed opposite the driving flange portion 130 of the starboard drive member 126. In embodiments, the starboard driven flange portion 140 defines a plurality of holes 162, each hole 162 being dimensioned and positioned to temporarily or permanently receive a portion of one of the plurality of rollers 148. In embodiments, each hole 162 is dimensioned and configured such that one of the plurality of rollers 148 cannot pass through the hole 162. In some embodiments, each hole 162 comprises a through hole. In other embodiments, each hole 162 comprises a blind hole. In some embodiments, the rollers 148 comprise a plurality of cylindrical rods. In other embodiments, the rollers 148 comprise a plurality of spherical balls.

Still referring to FIGS. 1 and 7-15, the surveillance robot 100 may also comprise a starboard spring element 158 that provides a spring force. In embodiments, the spring force provided by the starboard spring element 158 acts to bias each of the rollers toward the starboard driven flange portion 140 of the starboard driven member 138. In embodiments, the starboard spring element 158 comprises a wave spring. Wave springs that may be suitable in some applications are disclosed in the following patents, all of which are hereby incorporated by reference: U.S. Pat. Nos. 7,793,923, 6,758,465, 6,669,184, 6,598,406, 6,408,631, 6,068,250, and U.S. Pat. No. 5,558,393.

Still referring to FIGS. 1 and 7-15, in embodiments, the surveillance robot 100 comprises a pair of motors disposed inside the housing cavity 108 defined by the housing 106. In embodiments, the pair of motors comprises a port motor 122 and a port motor 122, each motor comprising a motor shaft. A port motor gear 124 may be fixed to the motor shaft of the port motor 122. The port motor gear 124 may comprise a plurality of gear teeth configured to mate with the toothed outer portion 128 of a port drive member 126. In embodiments, the port drive member 126 comprises a port driving flange portion 130 and the toothed outer portion 128. In embodiments, the port driving flange portion 130 defines a plurality apertures 132. The apertures 132 may be arranged in a radial pattern extending along a circular path. In embodiments, the port driving flange portion 130 of the port drive member 126 defines a central opening 166.

Still referring to FIGS. 1 and 7-15, in embodiments, the surveillance robot 100 comprises a port driven member 138 comprising a mating shaft portion 168 that extends through the central opening 166 defined by the port drive member 126. In embodiments, the driven member 138 is positioned so that a driven flange portion 140 of the driven member 138 is disposed opposite the driving flange portion 130 of the port drive member 126. In embodiments, the port driven flange portion 140 defines a plurality of holes 162, each hole 162 being dimensioned and positioned to temporarily or permanently receive a portion of one of the plurality of rollers 148. In embodiments, each hole 162 is dimensioned and configured such that one of the plurality of rollers 148 cannot pass through the hole 162. In some embodiments, each hole 162 comprises a through hole. In other embodiments, each hole 162 comprises a blind hole. The surveillance robot 100 may also comprise a port spring element 158 that provides a spring force. In embodiments, the spring force provided by the port spring element 158 acts to bias each of the rollers toward the port driven flange portion 140 of the port driven member 138. In embodiments, the port spring element 158 comprises a wave spring.

Referring to FIGS. 7-15, in embodiments, the starboard mating shaft portion 168 of the starboard driven member 138 extends through a lumen defined by the starboard spring element 158 and the port mating shaft portion 168 of the port driven member 138 extends through a lumen defined by the port spring element 158. In embodiments, the surveillance robot 100 further comprises a starboard pressure plate 150 and a port pressure plate 150. In embodiments, the starboard mating shaft portion 168 of the starboard driven member 138 extends through a starboard pressure plate opening defined by the starboard pressure plate 150. In embodiments, the starboard pressure plate 150 is disposed between the starboard spring element 158 and a plurality of rollers 148. In embodiments, these rollers are at least partially disposed in the apertures 132 defined by the starboard driving flange portion 130. In embodiments, the port mating shaft portion 168 of the port driven member 138 extends through a port pressure plate opening defined by the port pressure plate 150. In embodiments, the port pressure plate 150 is disposed between the port spring element 158 and a plurality of rollers 148. In embodiments, these rollers are at least partially disposed in the apertures 132 defined by the port driving flange portion 130.

Still referring to FIGS. 7-15, in embodiments, the surveillance robot 100 further comprises a starboard retaining ring 152, a starboard pressure disk 154, a port retaining ring 152, and a port pressure disk 154. In embodiments, the starboard retaining ring 152 is received in a groove defined by the starboard mating shaft portion 168 of the starboard driven member 138 and the port retaining ring 152 is received in a groove defined by the port mating shaft portion 168 of the port driven member 138. In embodiments, the starboard mating shaft portion 168 of the starboard driven member 138 extends through a starboard pressure disk opening defined by the starboard pressure disk 154. In embodiments, the starboard pressure disk 154 is disposed between the starboard spring element 158 and the starboard retaining ring 152. In embodiments, the port mating shaft portion 168 of the port driven member 138 extends through a port pressure disk opening defined by the port pressure disk 154. In embodiments, the port pressure disk 154 is disposed between the port spring element 158 and the port retaining ring 152.

Still referring to FIGS. 7-15, in embodiments, each driven shaft portion 142 includes a thread 144. In embodiments, a nut 146 may threadingly engage the thread on each driven shaft portion 142. In embodiments, a wheel may be fixed to each driven shaft portion 142.

Figure 14:
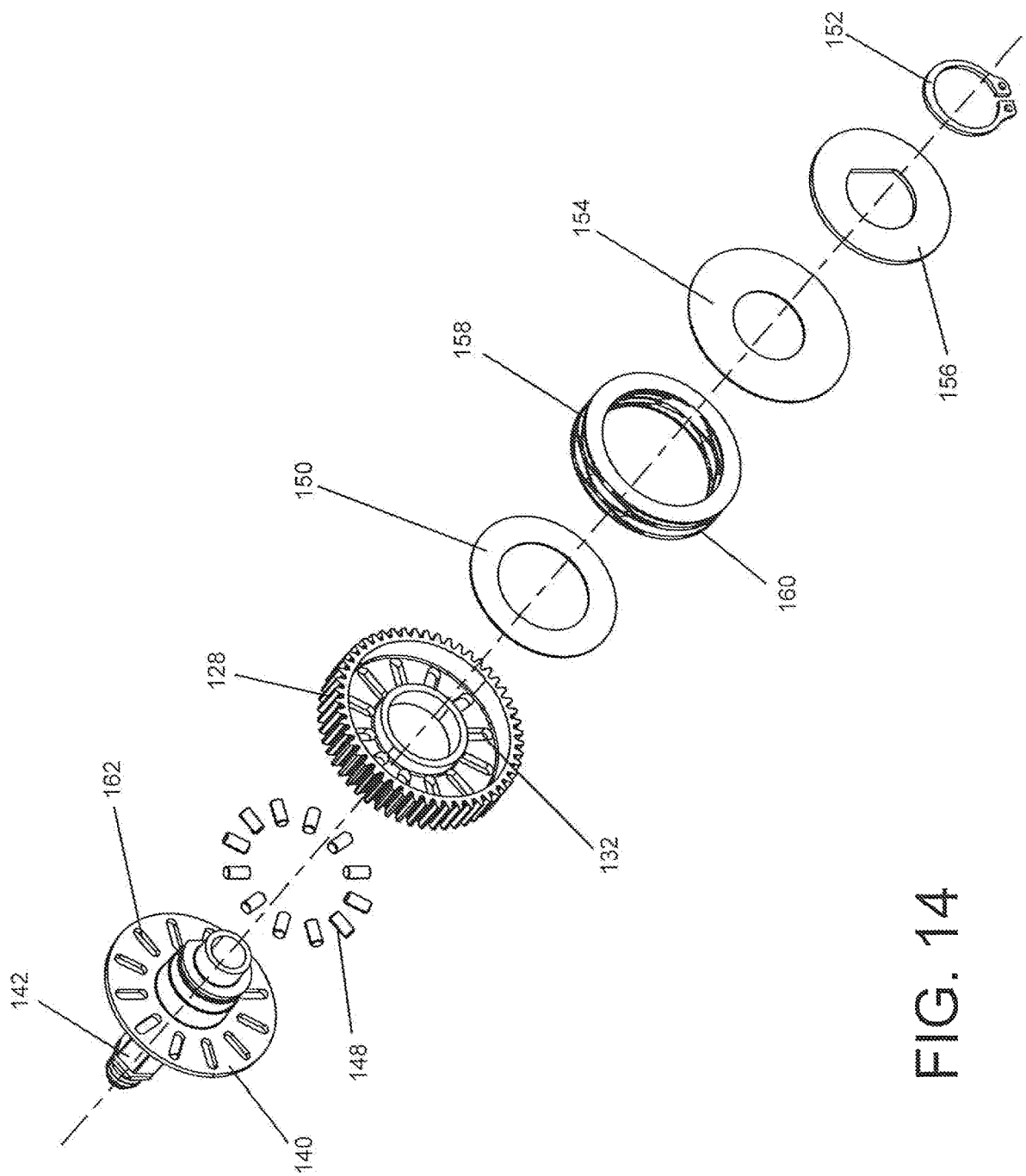
FIG. 14 is an exploded perspective view showing a torque limiting assembly/mechanism in accordance with the detailed description.
Figure 15:
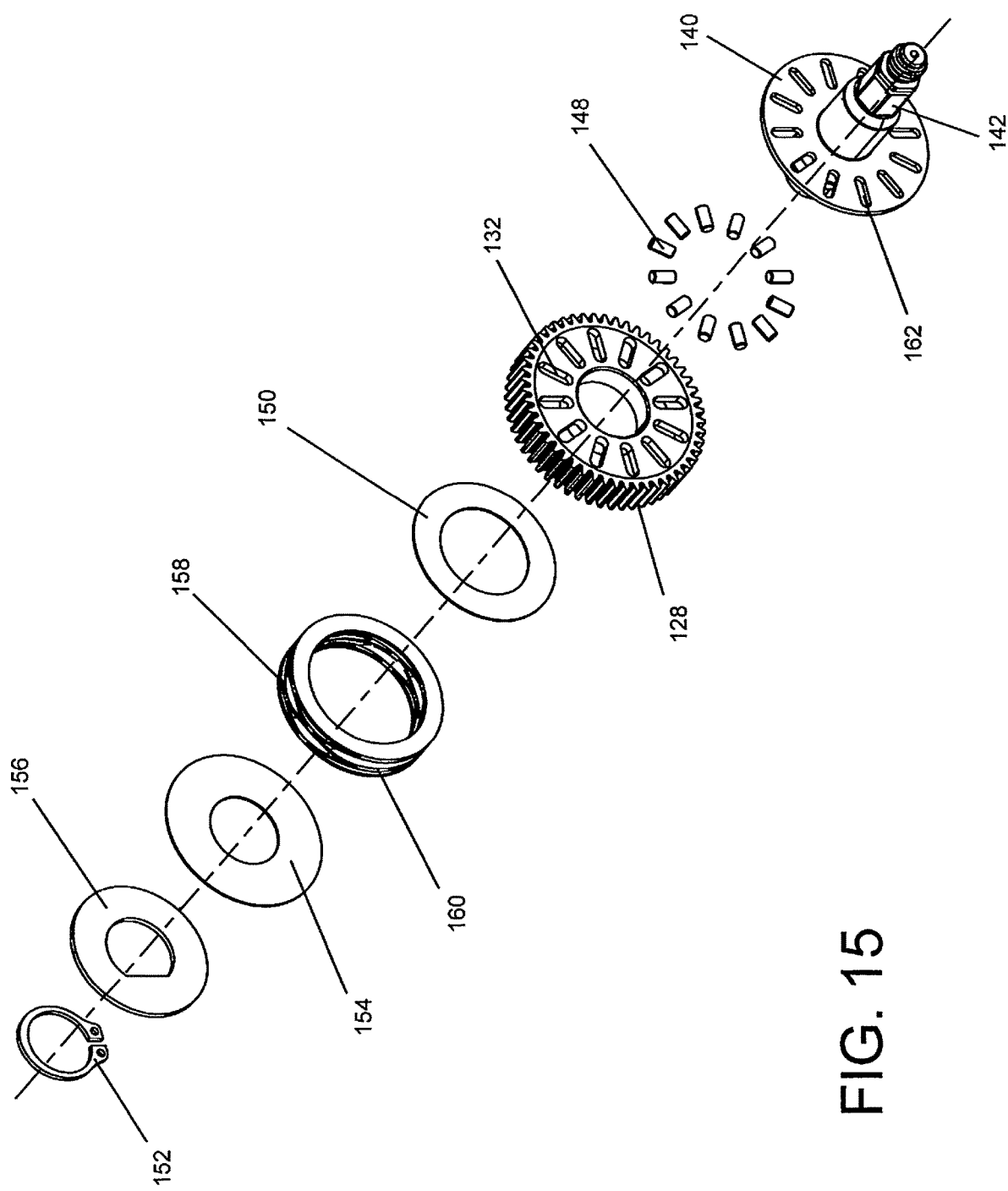
FIG. 15 is an exploded perspective view showing a torque limiting assembly/mechanism in accordance with the detailed description.

Referring to FIGS. 14-15, in embodiments, a starboard ring panel 156 is disposed between a starboard retaining ring 152 and a starboard pressure disk. In embodiments, a port ring panel 156 is disposed between a port retaining ring 152 and a port pressure disk. In embodiments, each spring element 158 defines a spring lumen 164.

Referring to FIG. 1, a forward direction Z and a rearward direction −Z are illustrated using arrows labeled "Z" and "−Z," respectively. A port direction X and a starboard direction −X are illustrated using arrows labeled "X" and "−X," respectively. An upward direction Y and a downward direction −Y are illustrated using arrows labeled "Y" and "−Y," respectively. The directions illustrated using these arrows may be conceptualized, by way of example and not limitation, from the point of view of a viewer looking through the camera of the robot. The directions illustrated using these arrows may be applied to the apparatus shown and discussed throughout this application. The port direction may also be referred to as the portward direction. In one or more embodiments, the upward direction is generally opposite the downward direction. In one or more embodiments, the upward direction and the downward direction are both generally orthogonal to the ZX plane defined by the forward direction and the starboard direction. In one or more embodiments, the forward direction is generally opposite the rearward direction. In one or more embodiments, the forward direction and the rearward direction are both generally orthogonal to the XY plane defined by the upward direction and the starboard direction. In one or more embodiments, the starboard direction is generally opposite the port direction. In one or more embodiments, the starboard direction and the port direction are both generally orthogonal to the ZY plane defined by the upward direction and the forward direction. Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," "portwardly," and "starboardly," should not be interpreted to limit the scope of the invention recited in the attached claims.

In embodiments, a throwable robot with a pair of drive wheels includes a pair of torque limiting mechanisms. In embodiments, the torque limiting mechanisms may prevent external shock loads from damaging a drivetrain. The wheels of a throwable robot may be subject to very high tangential forces upon impact in certain orientations and trajectories, which translates to a high shock load (torque) on the wheel's drivetrain. Isolating internal drive components from these shock loads is important for the longevity of the system, or even to survive just one throw. Therefore, a torque limiting mechanism may be included to allow the wheels to slip under impact conditions. The ideal slip torque is just higher than the peak load applied by the drivetrain in normal operations (with some acceptable margin), which minimizes the shock load transmitted to the drivetrain for a given set of operating conditions.

In embodiments, a torque limiting arrangement, where several hardened steel balls or rods are spring-biased into recesses on an output shaft, while being rotationally coupled by means of a ball cage to an input shaft or hub (the ball cage may be integral to the input shaft, e.g. axial holes through a web in the component). This creates a mechanism that, when a certain torque differential is applied across the input and output components, will disengage them rotationally and allow for relative rotation until the balls re-engage with their detents.

In embodiments, the slip torque may be modified via several parameters, including the radius at which the balls or cylindrical rods are placed (with respect to the main axis), the length of engagement with the detent (which in turn defines the angle of the normal force when disengaging), and the axial load on the balls.

In embodiments, the driving component comprises a drive member with a toothed outer portion, an integral roller cage and a recessed pocket to receive a spring. Roller engagement may be defined by the web thickness in a driving flange portion of the drive member, and the normal force at slip (between the rollers and the driven flange, which contributes to tangential breakout force and thus slip torque) is controlled by the diameter of the holes defined by the driven flange and their relationship to roller diameter and engagement depth. In embodiments, each hole is dimensioned and positioned to temporarily or permanently receive a portion of one of the plurality of rollers. In embodiments, each hole is dimensioned and configured such that one of the plurality of rollers cannot pass through the hole. In embodiments, the design is such that, when the clutch is engaged and in the absence of a torque on the assembly, the balls have some small clearance and are free to move in their pockets. In embodiments, pre-loaded rollers may be utilized.

In embodiments, the torque limiting mechanism includes a retaining ring that axial constrains an assembly including the spring element. In embodiments, the spring element may comprise a multi-turn wave spring with shim ends that allow the spring itself to contact the rollers (as opposed to an intermediate flat washer or other component). In embodiments, the wave spring is flexible and conforms somewhat to the rollers. In embodiments, the torque limiting mechanism includes a shim washer located between the retaining ring and spring and the thickness of the shim washer may be used to adjust the spring preload and therefore the slip torque. In embodiments, the torque limiting mechanism includes a drive face width substantially larger than the web thickness (4 mm vs. 1.1 mm for example), allowing for a compact and weight-saving design that still stands up to the applied loading.

In embodiments, a torque limiting mechanism comprises a plurality of evenly-spaced rollers and holes, the benefits of which may be that design, drafting, and machining are relatively simple, and that a consistent slip torque is provided at any given relative position, of which there will always be an equal amount to the number of rollers used.

In embodiments, a torque limiting mechanism comprises a plurality of unevenly-spaced rollers and holes, which results in fewer than the full set of rollers being engaged in corresponding holes in some positions, allowing fewer roller receiving positions than there are rollers to exhibit the full slip torque (though as a result, more detent positions will exist throughout the rotation that exhibit a lower slip torque). The result is that that except in specific clocking angles between the input and output components where all rollers are engaged with their respective holes, the slip torque will be lower than in the fully-engaged configuration. This embodiment may have the benefit of providing for a longer "throw" in a relatively low-torque condition (compared to the torque when all rollers are fully engaged), substantially reducing the amplitude of subsequent torque pulses applied as the rollers go into and out of engagement with the holes. This may have the effect of increasing fatigue life of the system, if typical slip events cause larger displacements than the spacing between rollers in a similar evenly-spaced design. An example of this second embodiment would be to have six rollers, alternately spaced at 50° and 70° from the previous roller. Upon slipping from the initial position, the two members would rotate 50° before three rollers re-engage with their holes, while the other three rollers are 20° "out of phase" with the nearest holes. The slip torque then would be roughly half of the fully-engaged slip torque. Upon slipping again, another 20° rotation would occur, resulting in the other three rollers engaging and again producing approximately half the fully-engaged slip torque. Finally, a third slip would produce another 50° of rotation, and the entire assembly would have rotated 120° total, resulting in full ball engagement. Notably, in this scenario, three slip events take place to traverse that 120°, vs. the two events that would occur if the rollers were spaced at even 60° intervals. In embodiments, this may be extended to a repeating pattern of 50-70-60 degrees or to other patterns. In principle, this practice may be extended such that only a single relative position between the input and output shafts will produce more than one engaged ball at a time, though in practice this may be difficult to achieve because certain rollers may be very nearly in-phase and even beginning to engage with the next detent in some positions.

In embodiments the robot wheels are less than 6 inches in diameter. In embodiments, less than 5 inches. In embodiments, less than 4 inches. In embodiments, the robot weighs less than 5 pounds.

A feature and benefit of embodiments is a highly consistent torque limiting function, both between different assemblies and through time on a given assembly.

A feature and benefit of embodiments is a torque limiting function that remains consistent while being exposed to contaminants such as water, grease and oil. A related feature and benefit of embodiments is a design that allows portions of the drivetrain to be lubricated without concern that lubricant will interfere with the operation of the torque limiting mechanism.

In embodiments, each drive wheel includes grit fixed to selected portions thereof or the entire drive wheel. In embodiments, an adhesive-backed sheet embedded with abrasive grit (such as an anti-slip tape material) may be cut into a suitable shape, by die cutting or laser cutting or similar, and applied to the tractive surface of the wheel. In embodiments, an edge sealer, comprising, for example, an elastomeric sealant, may be applied around the exposed edges of the applied tape, helping extend longevity in wet conditions. In embodiments, each drive wheel comprises a thermoplastic elastomer, such as a polyurethane, the tractive surface of which is heated and simultaneously pressed against a layer of loose abrasive grit, thereby embedding the grit in the surface of the wheel once cooled. In the embodiments discussed above, a hard abrasive material such as aluminum oxide or silicon carbide may be fixed to the drive wheels and provide longevity and effectiveness on harder surfaces. In embodiments, larger grits (in the range of 8-24 mesh) are used for embedding because they expose more of the grit particle geometry while still significantly embedding into the substrate.

The following United States patents are hereby incorporated by reference herein: U.S. Pat. Nos. 10,046,819, 9,061, 544, 6,548,982, 6,502,657, U.S. Pat. No. D637,217, and U.S. Pat. No. D626,577. Components illustrated in such patents may be utilized with embodiments herein. Incorporation by reference is discussed, for example, in MPEP section 2163.07(B).

The patents and other references mentioned above in all sections of this application are herein incorporated by reference in their entirety for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A throwable surveillance robot weighing less than six pounds comprising:
   a pair of axially aligned drive wheels, each wheel having a maximum diameter, the pair of drive wheels comprising a starboard drive wheel and a port drive wheel;
   a housing extending between the wheels, the housing being disposed within a cylinder defined by the maximum diameters of the drive wheels, the housing defining a housing cavity containing a receiver, a transmitter and a video camera connected to the transmitter;
   a pair of motors disposed inside the housing cavity, the pair of motors comprising a starboard motor and a port motor, each motor comprising a motor shaft;
   a starboard motor gear fixed to the motor shaft of the starboard motor, the starboard motor gear comprising a plurality of gear teeth;
   a starboard drive member comprising a toothed outer portion, the toothed outer portion of the starboard drive member engaging the gear teeth of the starboard motor gear, the starboard drive member comprising a driving flange portion, the driving flange portion defining a plurality apertures, the apertures being arranged in a radial pattern extending along a circular path, the starboard drive member defining a central opening;
   a starboard driven member comprising a mating shaft portion extending through the central opening defined by the starboard drive member so that the a driven flange portion of the driven member is disposed opposite the driving flange of the starboard drive member, the starboard driven flange portion defining a plurality of holes, each hole being dimensioned and positioned to temporarily or permanently receive a portion of one of the plurality of rollers, each hole being dimensioned and configured such that one of the plurality of rollers cannot pass through the hole;

a starboard spring element providing a spring force, the spring force acting to bias each of the rollers toward the driven flange of the starboard driven member.

2. The surveillance robot of claim 1 further comprising:
a port motor gear fixed to the motor shaft of the port motor, the port motor gear comprising a plurality of gear teeth;
a port drive member comprising a toothed outer portion, the toothed outer portion of the port drive member engaging the gear teeth of the port motor gear, the port drive member comprising a driving flange portion, the driving flange portion defining a plurality apertures, the apertures being arranged in a radial pattern extending along a circular path, the port drive member defining a central opening;
a port driven member comprising a mating shaft portion extending through the central opening defined by the port drive member so that the a driven flange portion of the driven member is disposed opposite the driving flange of the port drive member, the port driven flange portion defining a plurality of holes, each hole being dimensioned and positioned to temporarily or permanently receive a portion of one of the plurality of rollers, each hole being dimensioned and configured such that one of the plurality of rollers cannot pass through the hole;
a port spring element providing a spring force, the spring force acting to bias each of the rollers toward the driven flange of the port driven member.

3. The surveillance robot of claim 2 wherein each spring element comprises one or more wave springs.

4. The surveillance robot of claim 2 wherein the rollers comprise a plurality of cylindrical rods.

5. The surveillance robot of claim 2 wherein the rollers comprise spherical balls.

6. The surveillance robot of claim 2 wherein the holes defined by the starboard driven flange portion and the port driven flange portion comprise through holes.

7. The surveillance robot of claim 2 wherein the holes defined by the starboard driven flange portion and the port driven flange portion comprise blind holes.

8. The surveillance robot of claim 2 wherein:
the starboard mating shaft portion of the starboard driven member extends through a lumen defined by the starboard spring element; and
the port mating shaft portion of the port driven member extends through a lumen defined by the port spring element.

9. The surveillance robot of claim 2 wherein:
the surveillance robot further comprises a starboard pressure plate and a port pressure plate;
the starboard mating shaft portion of the starboard driven member extends through a starboard pressure plate opening defined by the starboard pressure plate, the starboard pressure plate being disposed between the starboard spring element and a plurality of rollers, the roller being at least partially disposed in the apertures defined by the starboard driving flange portion; and
the port mating shaft portion of the port driven member extends through a port pressure plate opening defined by the port pressure plate, the port pressure plate being disposed between the port spring element and a plurality of rollers, the roller being at least partially disposed in the apertures defined by the port driving flange portion.

10. The surveillance robot of claim 2 wherein:
the surveillance robot further comprises a starboard retaining ring, a starboard pressure disk, a port retaining ring, and a port pressure disk, the starboard retaining ring being received in a groove defined by the starboard mating shaft portion of the starboard driven member and the port retaining ring being received in a groove defined by the port mating shaft portion of the port driven member;
the starboard mating shaft portion of the starboard driven member extends through a starboard pressure disk opening defined by the starboard pressure disk, the starboard pressure disk being disposed between the starboard spring element and the starboard retaining ring;
the port mating shaft portion of the port driven member extends through a port pressure disk opening defined by the port pressure disk, the port pressure disk being disposed between the port spring element and the port retaining ring.

11. A throwable surveillance robot weighing less than six pounds comprising:
a pair of axially aligned drive wheels, each wheel having a maximum diameter, the pair of drive wheels comprising a starboard drive wheel and a port drive wheel;
a housing extending between the wheels, the housing being disposed within a cylinder defined by the maximum diameters of the drive wheels, the housing defining a housing cavity containing a receiver, a transmitter and a video camera connected to the transmitter;
a starboard drive member, the starboard drive member comprising a driving flange portion, the driving flange portion defining a plurality apertures, the apertures being arranged in a radial pattern extending along a circular path, the starboard drive member defining a central opening;
a starboard driven member comprising a mating shaft portion extending through the central opening defined by the starboard drive member so that the a driven flange portion of the driven member is disposed opposite the driving flange of the starboard drive member, the starboard driven flange portion defining a plurality of holes, each hole being dimensioned and positioned to temporarily or permanently receive a portion of one of the plurality of rollers, each hole being dimensioned and configured such that one of the plurality of rollers cannot pass through the hole;
a starboard spring element providing a spring force, the spring force acting to bias each of the rollers toward the driven flange of the starboard driven member.

12. The surveillance robot of claim 11 further comprising:
a port drive member comprising a driving flange portion, the driving flange portion defining a plurality apertures, the apertures being arranged in a radial pattern extending along a circular path, the port drive member defining a central opening;
a port driven member comprising a mating shaft portion extending through the central opening defined by the port drive member so that the a driven flange portion of the driven member is disposed opposite the driving flange of the port drive member, the port driven flange portion defining a plurality of holes, each hole being dimensioned and positioned to temporarily or permanently receive a portion of one of the plurality of rollers, each hole being dimensioned and configured such that one of the plurality of rollers cannot pass through the hole;

a port spring element providing a spring force, the spring force acting to bias each of the rollers toward the driven flange of the port driven member.

13. The surveillance robot of claim 12 wherein each spring element comprises one or more wave springs.

14. The surveillance robot of claim 12 wherein the rollers comprise a plurality of cylindrical rods.

15. The surveillance robot of claim 12 wherein the rollers comprise spherical balls.

16. The surveillance robot of claim 12 wherein the holes defined by the starboard driven flange portion and the port driven flange portion comprise through holes.

17. The surveillance robot of claim 12 wherein the holes defined by the starboard driven flange portion and the port driven flange portion comprise blind holes.

18. The surveillance robot of claim 12 wherein:
the starboard mating shaft portion of the starboard driven member extends through a lumen defined by the starboard spring element; and
the port mating shaft portion of the port driven member extends through a lumen defined by the port spring element.

19. The surveillance robot of claim 12 wherein:
the surveillance robot further comprises a starboard pressure plate and a port pressure plate;
the starboard mating shaft portion of the starboard driven member extends through a starboard pressure plate opening defined by the starboard pressure plate, the starboard pressure plate being disposed between the starboard spring element and a plurality of rollers, the roller being at least partially disposed in the apertures defined by the starboard driving flange portion; and
the port mating shaft portion of the port driven member extends through a port pressure plate opening defined by the port pressure plate, the port pressure plate being disposed between the port spring element and a plurality of rollers, the roller being at least partially disposed in the apertures defined by the port driving flange portion.

20. The surveillance robot of claim 12 wherein:
the surveillance robot further comprises a starboard retaining ring, a starboard pressure disk, a port retaining ring, and a port pressure disk, the starboard retaining ring being received in a groove defined by the starboard mating shaft portion of the starboard driven member and the port retaining ring being received in a groove defined by the port mating shaft portion of the port driven member;
the starboard mating shaft portion of the starboard driven member extends through a starboard pressure disk opening defined by the starboard pressure disk, the starboard pressure disk being disposed between the starboard spring element and the starboard retaining ring;
the port mating shaft portion of the port driven member extends through a port pressure disk opening defined by the port pressure disk, the port pressure disk being disposed between the port spring element and the port retaining ring.

* * * * *